United States Patent
Commaret et al.

(10) Patent No.: US 8,875,517 B2
(45) Date of Patent: Nov. 4, 2014

(54) DIFFUSER FOR TURBINE ENGINE INCLUDING INDENTED ANNULAR WEBS

(75) Inventors: Patrice Andre Commaret, Rubelles (FR); Didier Hippolyte Hernandez, Quiers (FR); Romain Nicolas Lunel, Montereau sur le Jard (FR)

(73) Assignee: SNECMA, Paris (FR)

( * ) Notice: Subject to any disclaimer, the term of this patent is extended or adjusted under 35 U.S.C. 154(b) by 1091 days.

(21) Appl. No.: 12/919,772

(22) PCT Filed: Feb. 20, 2009

(86) PCT No.: PCT/FR2009/000192
§ 371 (c)(1),
(2), (4) Date: Nov. 30, 2010

(87) PCT Pub. No.: WO2009/115690
PCT Pub. Date: Sep. 24, 2009

(65) Prior Publication Data
US 2011/0056207 A1 Mar. 10, 2011

(30) Foreign Application Priority Data

Feb. 27, 2008 (FR) .................................... 08 01059

(51) Int. Cl.
*F02C 1/00* (2006.01)
*F23R 3/60* (2006.01)
*F02C 3/08* (2006.01)
*F04D 29/44* (2006.01)
*F23R 3/28* (2006.01)

(52) U.S. Cl.
CPC ................ *F02C 3/08* (2013.01); *Y02T 50/671* (2013.01); *F23R 3/60* (2013.01); *F04D 29/444* (2013.01); *F23R 3/283* (2013.01); *F04D 29/441* (2013.01)
USPC .......................................................... 60/751

(58) Field of Classification Search
USPC ........... 60/751, 269, 726, 740, 746, 796, 800, 60/804; 415/136, 208.3, 208.4, 211.1
See application file for complete search history.

(56) References Cited

U.S. PATENT DOCUMENTS

| | | | | |
|---|---|---|---|---|
| 4,327,547 A * | 5/1982 | Hughes et al. | ............. | 60/39.463 |
| 4,416,111 A | 11/1983 | Lenahan et al. | | |
| 4,462,204 A * | 7/1984 | Hull | ............................... | 60/806 |
| 5,339,622 A * | 8/1994 | Bardey et al. | ............... | 60/39.092 |
| 6,035,627 A * | 3/2000 | Liu | ................................. | 60/785 |
| 7,581,397 B2 * | 9/2009 | Strangman et al. | ............. | 60/751 |
| 7,823,387 B2 | 11/2010 | Commaret et al. | | |
| 8,438,855 B2 * | 5/2013 | Schott | ............................. | 60/751 |
| 2002/0174657 A1 | 11/2002 | Rice et al. | | |
| 2007/0183890 A1 | 8/2007 | Nolcheff et al. | | |

FOREIGN PATENT DOCUMENTS

| | | |
|---|---|---|
| DE | 44 38 611 | 5/1996 |
| EP | 1 818 511 | 8/2007 |
| GB | 2 093 532 | 9/1982 |

* cited by examiner

*Primary Examiner* — Phutthiwat Wongwian
*Assistant Examiner* — Arun Goyal
(74) *Attorney, Agent, or Firm* — Oblon, Spivak, McClelland, Maier & Neustadt, L.L.P.

(57) ABSTRACT

A diffuser for a turbine engine that includes two annular webs extending inside one another and connected between them by substantially radial vanes, wherein the downstream peripheral edge of at least one of the webs includes indentions evenly distributed about the longitudinal axis of the diffuser.

16 Claims, 3 Drawing Sheets

DIFFUSER FOR TURBINE ENGINE INCLUDING INDENTED ANNULAR WEBS

Figure 1:
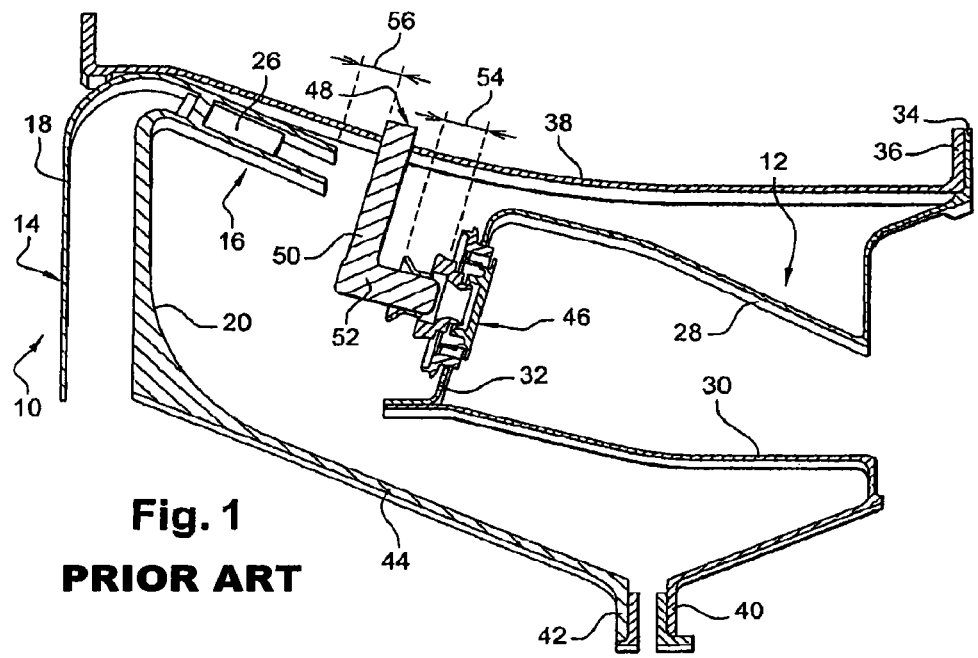

This invention relates to a diffuser for a turbine engine and a turbine engine, such as a jet engine or a turboprop engine for aircraft, comprising a diffuser arranged upstream of an annular combustion chamber, the diffuser and the combustion chamber being surrounded by a substantially cylindrical external casing.

A diffuser for turbine engine can have a generally cylindrical form, or a curved L-shaped form comprising a radial upstream portion connected at its external periphery to a downstream cylindrical portion, according to which the last stage of the compressor arranged upstream of the diffuser is an axial stage or a centrifugal stage. In both cases, the diffuser comprises two substantially parallel annular webs which extend inside one another and which are connected between them by substantially radial vanes. The air which exits from the diffuser is injected into an annular enclosure delimited by the external casing in order to provide the air supply to the combustion chamber.

The combustion chamber comprises two walls of revolution, respectively internal and external, which are connected between them at their upstream ends by a substantially radial chamber base annular wall. This chamber base wall comprises orifices for mounting systems for injecting a mixture of air and of fuel inside the chamber. The fuel is brought by injectors evenly distributed around the longitudinal axis of the chamber and extending substantially radially towards the interior from the external casing. Each injector has a substantially L-shaped form and comprises an upstream radial duct which is fixed at its radially external end on the external casing and which is connected at its radially internal end to a head or a nose extending substantially axially downstream, this head being engaged in a system for injecting an air/fuel mixture.

In current art, the downstream peripheral edges of the webs of the diffuser are located at a relatively substantial distance in the axial direction of the radial ducts of the fuel injectors. During an operation of dismounting of an injector of a motor assembly, this distance or this axial play is indeed required in order to displace in axial translation this injector upstream in order to disengage its axial head from the corresponding injection system. The injectors are dismounted in particular to remove the deposits of soot and coke on the heads of the injectors, which could hinder the supply of fuel for the chamber. However, the aforementioned axial play which has no influence on the supply of air for the combustion chamber, results in an increase in the length or axial dimension of the turbine engine and therefore an increase in the mass of the turbine engine, which is always detrimental in the aeronautics industry.

The invention has in particular for purpose to provide a simple, effective and economical solution to these problems.

It proposes to this effect a diffuser for a turbine engine, comprising two annular webs extending inside one another and connected between them by substantially radial vanes, characterised in that the downstream peripheral edge of at least one of the webs comprises indentations evenly distributed around the longitudinal axis of the diffuser.

The diffuser can be of the axial type and comprise two substantially cylindrical webs that are parallel between them, or be a part of a diffuser-straightener unit, this unit comprising two webs with substantially L-shaped section.

The invention further proposes a turbine engine, such as a jet engine or a turboprop engine for aircraft, characterised in that it comprises an annular diffuser such as described hereinabove and an annular combustion chamber arranged downstream of the diffuser and inside an external casing of the turbine engine, the combustion chamber being supplied with fuel by injectors arranged between the diffuser and the chamber and extending substantially radially towards the interior from the external casing, the indentations of the downstream peripheral edge of the or each web of the diffuser being aligned in the axial direction with the injectors in such a way as to allow for a translation upstream of each injector in an indentation of the or each web for the dismounting of this injector.

According to the invention, the indentations of the webs of the diffuser authorise a retraction of the injectors that is sufficient to disengage them from the injection systems and to make possible their dismounting. The diffuser can as such be brought close axially to the fuel injectors and the combustion chamber in such a way as to reduce, and even suppress, the axial play between the downstream peripheral edges of the webs of the diffuser and the radial ducts of the injectors. The length of the turbine engine is then decreased significantly.

The diffuser according to the invention can be an axial diffuser or be part of a diffuser-straightener unit.

Preferentially, the two webs of the diffuser include on their downstream peripheral edges indentations which are aligned radially two-by-two from one web to the other and which are aligned axially with the fuel injectors.

The indentations have for example a generally U- or C-shaped form of which the opening is directed downstream. The or each web of the diffuser can comprise from 16 to 20 indentations evenly distributed around the longitudinal axis of the diffuser, according to the number of injectors of the combustion chamber.

These indentations can have a length in the axial direction and a width in the circumferential direction of a magnitude of approximately 10 mm. The dimensions of the indentations are in particular determined according to the dimensions of the injectors, in such a way that the indentations can receive these injectors when they are in their retracted position wherein they are disengaged from the injection systems. The length of the indentations is therefore determined by the distance required to disengage the heads of the injectors from the injection systems, and their width is determined by the external diameter or the transversal encumbrance of the radial ducts of the injectors.

Advantageously, the indentations are formed on a downstream end portion of the or each web of the diffuser which extends downstream of the vanes, in such a way as to not disturb the flow of the air at the output of the diffuser. The downstream end portion of the or each web can be reinforced and rigidified by at least one allowance or a stiffener in such a way as to limit the vibrations of this end portion during operation. The downstream peripheral edge of the or each web can furthermore be of the "dropped edge" type and be connected to a substantially radial annular edge by an annular joint zone having a rounded cross-section profile.

Figure 2:
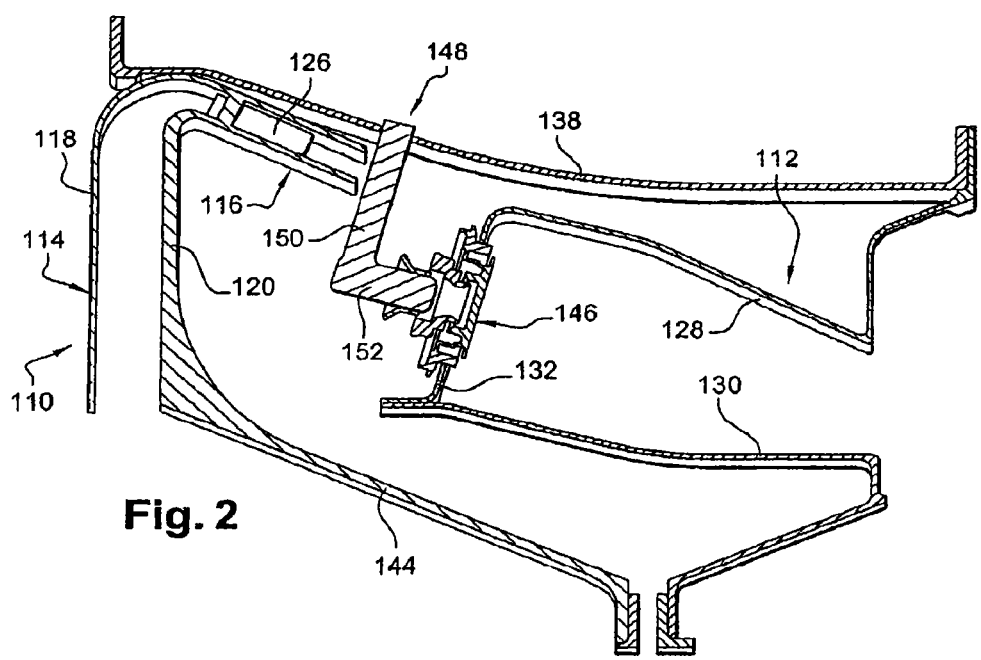
Figure 3:
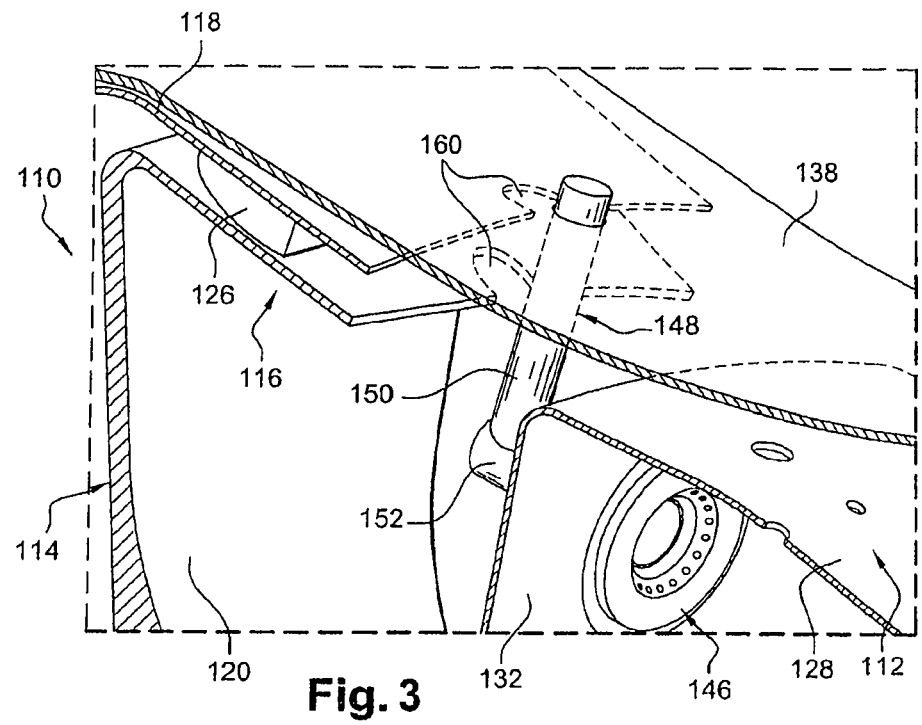
Figure 4:
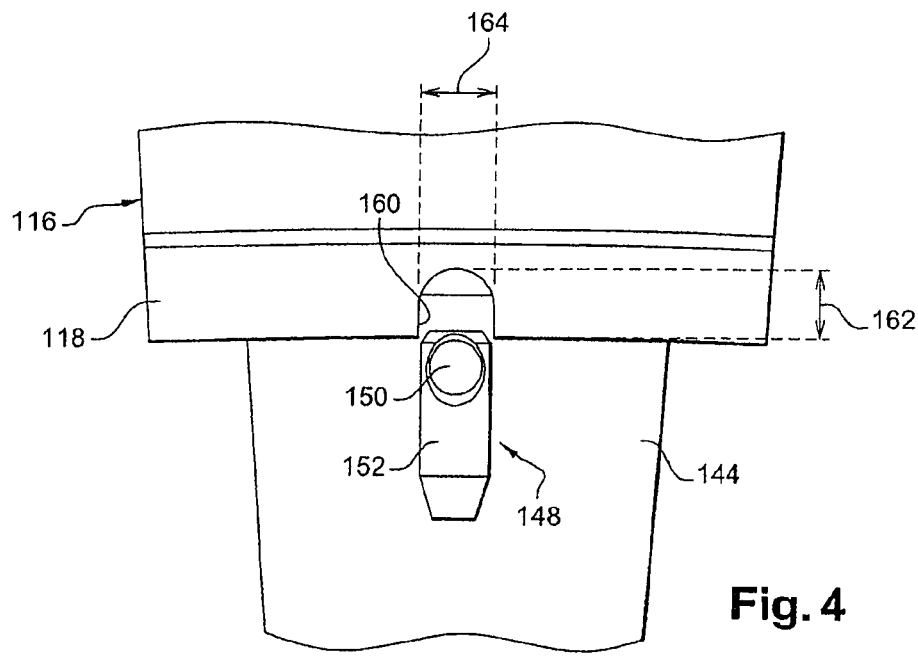
Figure 5:
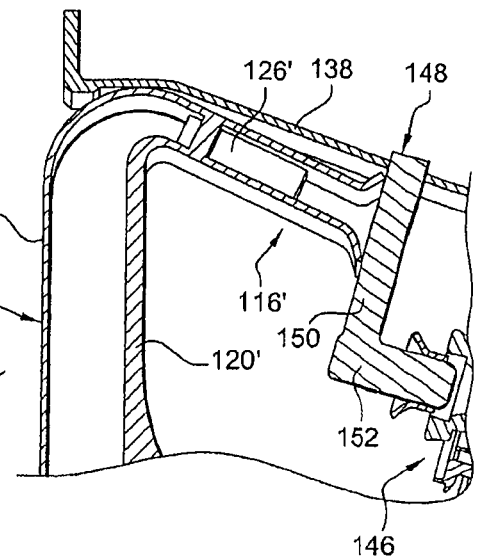
Figure 6:
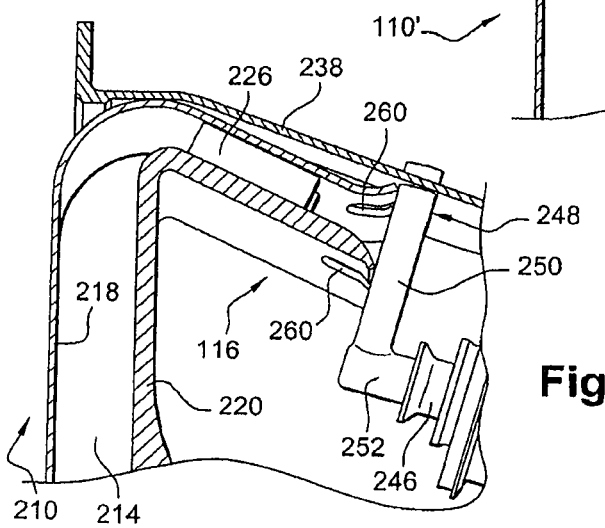
Figure 7:
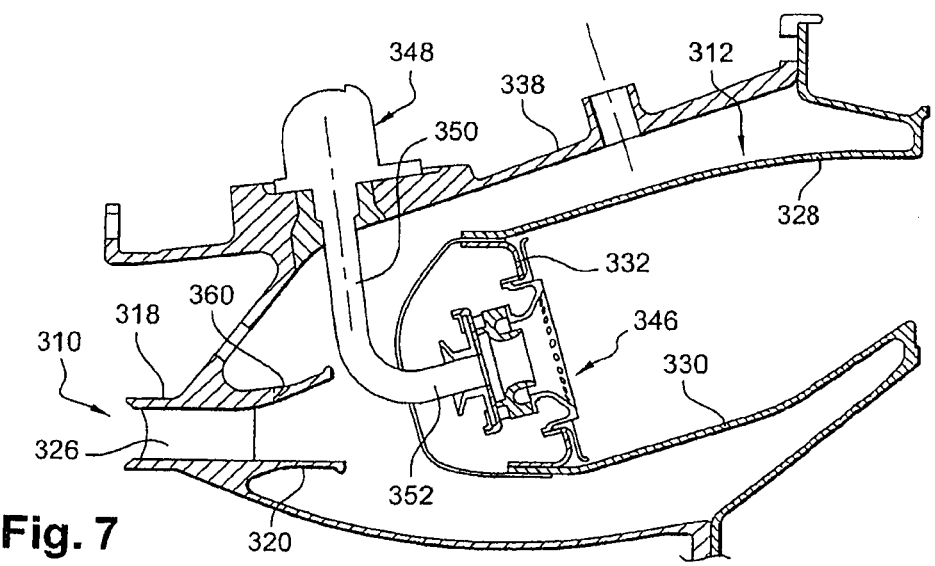

The invention shall be better understood and other details, characteristics and advantages of this invention shall appear more clearly when reading the following description provided by way of a non-restricted example and in reference to the annexed drawings, wherein:

FIG. 1 is a diagrammatical half-view in axial cross-section of a diffuser-straightener unit and of a combustion chamber of a turbine engine according to prior art, FIG. 2 is a view corresponding to FIG. 1 and shows a turbine engine according to the invention, FIG. 3 is a perspective diagrammatical view of the turbine engine in FIG. 2, viewed from downstream and from the side, FIG. 4 is a diagrammatical top view of the fuel injector and of the diffuser-straightener unit in FIG. 3, FIG. 5 is a partial diagrammatical view in axial cross-section of a diffuser-straightener unit of a turbine engine according to an alternative embodiment of the invention, FIG. 6 is a partial diagrammatical view in axial cross-section of a diffuser-straightener unit of a turbine engine according to another alternative embodiment of the invention, FIG. 7 is a diagrammatical half-view in axial cross-section of an axial diffuser according to the invention and of a combustion chamber of a turbine engine.

Reference is first made to FIG. 1 which shows a portion of a turbine engine, such as a jet engine or a turboprop engine for aircraft, comprising from upstream to downstream, in the direction of the flow of the gases inside the turbine engine, a centrifugal stage of compressor (not shown), an L-shaped diffuser-straightener unit 10 and a combustion chamber 12.

The diffuser-straightener unit 10 comprises a substantially radial upstream annular portion 14 forming a diffuser, connected at its external periphery to a substantially cylindrical or tapered downstream annular portion 16 forming a straightener. The unit 10 defines an L-shaped annular duct of which the intake is aligned radially with the output of the centrifugal stage of the compressor, and of which the output is directed downstream. The air that exits from the straightener 16 penetrates into an annular enclosure delimited by a substantially cylindrical external casing 38 wherein is arranged the combustion chamber 12 in order to provide for the supply of air of this chamber in a manner well known to those skilled in the art.

The unit 10 comprises two annular webs 18, 20 with an L-shaped cross section which are parallel and which are connected between them by substantially radial vanes. Each web 18, 20 comprises an upstream radial portion connected at its external periphery to a substantially cylindrical or tapered downstream portion. The radial walls of the webs 18, 20 are connected between them by vanes not shown, and their cylindrical walls are connected by vanes 26.

In the example shown, the vanes 26 extend over only a fraction of the axial dimension of the cylindrical portions of the webs 18, 20, and the end portions of these webs which extend downstream of the vanes 26 are parallel between them.

The combustion chamber 12 has a generally annular shape and comprises two coaxial walls of revolution 28, extending inside one another and connected at their upstream ends by a chamber base annular wall 32.

The external wall of revolution 28 of the chamber is connected at its downstream end to a radially external annular flange for fastening 34 to an annular flange 36 of the external casing 38.

The internal wall of revolution 30 of the chamber is connected at its downstream end to a radially internal annular flange for fastening 40 to an annular flange 42 provided at the downstream end of a downstream annular plate 44 for supporting the diffuser-straightener unit 10. The upstream end of the plate 44 is connected to the radially internal end of the web 20 of the unit 10.

The chamber base wall 32 comprises orifices for mounting systems 46 for injecting a mixture of air and of fuel inside the chamber, the air coming from the unit 10 and the fuel being brought by injectors 48 fixed on the external casing 38 and evenly distributed over a circumference around the longitudinal axis of the chamber.

Each injector 48 comprises a radial duct 50 which extends radially towards the inside from its radially external end fixed on the external casing 38. The radially internal end of the radial duct 48 is connected to a nose or to a fuel injection head 52 which extends axially downstream and is engaged in a device for centring a system of injection 46.

In current art, when the injection head 52 of an injector is engaged over an axial distance 54 in the device for centring of the injection system 46, the downstream peripheral edges of the webs 18, 20 of the unit 10 must be separated from the radial ducts 50 of the injectors by an axial play 56 at least equal to this axial distance 54. This axial play 56 is indeed required in order to be able to displace in axial translation upstream the injector in order to disengage it from the injection system 46. This operation of dismounting is carried out regularly on the motor assembly in order to clean the heads 52 of the injectors and prevent the accumulation of soot and of coke on these heads which could hinder the supply of fuel of the chamber 12, or for any other maintenance intervention.

The invention makes it possible to reduce and even suppress this axial play 56 thanks to indentations or notches formed in the downstream peripheral edge of at least one of the webs 18, 20 of the unit 10, across from the injectors, these indentations being intended to receive the injectors 48 during their dismounting and their disengaging from the injection systems 46.

In the example embodiment shown in FIGS. 2 to 4, each web 118, 120 of the unit 110 ends in the immediate vicinity of the injectors 148 and comprises a number of indentations 160 equal to the number of fuel injectors 148 of the turbine engine. Each web comprises for example between 16 and 20 indentations 160 evenly distributed around the longitudinal axis of the turbine engine. The indentations 160 of the internal web 120 are aligned in the radial direction with the indentations 160 of the external web 118 and are aligned in the axial direction with the radial ducts 150 of the injectors 148.

The indentations 160 have a U- or C-shaped form of which the opening is directed downstream. The bottom of each indentation has a generally rounded shape with internal diameter greater than the external diameter of the radial duct 150 of an injector in such a way that at least one portion of the duct 150 of the injector can be received in this indentation. The indentations have for example a length 162 or an axial dimension of a magnitude of approximately 10 mm and a width 164 or a dimension in the circumferential direction of a magnitude of approximately 10 mm.

In the example shown, the indentations 160 are conformed to receive the duct 150 of the injectors in their entirety during their disengagement from the injection systems 146 and their displacement in axial translation upstream. Alternatively, the indentations can have a suitable shape and dimensions determined in order to house only a portion of the radial ducts 150 of the injectors.

The indentations 160 extend axially over a major portion of the axial dimension of the downstream ends of the webs 118, 120 downstream of the vanes 126, the upstream ends of the indentations 160 being located at a distance from the trailing edges of the vanes 126 of the unit 110.

Advantageously, the indentations 160 are not formed between the radial vanes 126 and therefore do not disturb or disturb very little the flow of air in the diffuser-straightener unit. The supplying in air of the chamber is therefore not affected by the indentations of the webs 118, 120 of the unit.

In the alternative embodiment shown in FIG. 5, the external web 118' of the unit comprises at its downstream end a rounded annular edge which extends downstream substantially radially towards the exterior. The internal web 120' of the unit comprises at its downstream end a rounded annular edge which extends downstream substantially radially towards the interior. The downstream edges of the webs 118', 120' make it possible to rigidify the downstream end of the unit and to limit during operation the deformations in bending and the vibrations of the downstream end portions of these webs, which can be favoured by the presence of indentations 160.

In another alternative shown in FIG. 6, the thickness of the internal web 220 of the unit 210 has been increased in such a way as to rigidify this web. The external web 218 of the unit can also be rigidified in the same way.

In another alternative not shown, the internal and external webs of the unit can be rigidified or reinforced using stiffeners which are either machined directly on the webs, or added and fixed by brazing or welding on these webs.

The indentations 360 for dismounting injectors 348 can also be formed on at least one of the downstream peripheral edges of the webs 318, 320 from an axial diffuser 310 (see FIG. 7), this axial diffuser being arranged downstream of a compressor with axial output, not shown. The axial diffuser 310 comprises two webs 318, 320 substantially cylindrical which extend in parallel inside one another and which are connected between them by substantially radial vanes 326. The indentations 360 are in the example shown formed on the downstream peripheral edge of the external web 318 of the diffuser, downstream of the vanes 326 of this diffuser. These indentations 360 therefore do not disturb or disturb very little the flow of air in the axial diffuser. The indentations 360 are aligned axially with the radial ducts 350 of the injectors 348 and are of the same type as the indentations described in reference to FIGS. 2 to 6.

The invention claimed is:

1. A turbine engine, comprising:
    an annular diffuser comprising two annular webs extending inside one another and connected between them by substantially radial vanes, wherein a downstream peripheral edge of at least one of the webs comprises indentations evenly distributed around the longitudinal axis of the diffuser; and
    an annular combustion chamber arranged downstream of the diffuser and inside an external casing of the turbine engine, the combustion chamber being adapted to be supplied with fuel by injectors arranged between the diffuser and the chamber and extending substantially radially towards an interior from the external casing, the indentations of the downstream peripheral edge of each web of the diffuser being aligned in the axial direction with the injectors to allow for a translation upstream of each injector in an indentation of each web for dismounting of the injector.

2. A turbine engine according to claim 1, wherein the diffuser is associated with a straightener to form a diffuser-straightener unit, the webs having a substantially L-shaped cross-section.

3. A turbine engine according to claim 1, wherein the diffuser is of axial type, the webs being substantially cylindrical and parallel between them.

4. A turbine engine according to claim 1, wherein the two webs of the diffuser include on their downstream peripheral edges indentations that are aligned radially two-by-two from one web to the other and that are aligned axially with the fuel injectors.

5. A turbine engine according to claim 1, wherein the indentations have a generally U-shaped or C-shaped form of which an opening is directed downstream.

6. A turbine engine according to claim 1, wherein the indentations have a width in the circumferential direction that is substantially equal to or greater than the external diameter of the injectors.

7. A turbine engine according to claim 1, wherein the indentations have a length in the axial direction substantially equal to or greater than a length required for disengaging of the injectors.

8. A turbine engine according to claim 6, wherein the indentations have a length and/or a width of a magnitude of approximately 10 mm.

9. A turbine engine according to claim 1, wherein each web of the diffuser comprises a number of indentations equal to the number of injectors, the indentations being evenly distributed around the longitudinal axis of the diffuser.

10. A turbine engine according to claim 1, wherein the indentations are formed on a downstream end portion of each web that extends downstream of vanes of the diffuser.

11. A turbine engine according to claim 10, wherein the downstream end portion of each web is reinforced by at least one allowance or a stiffener.

12. A turbine engine according to claim 10, wherein the downstream peripheral edge of each web is connected to a substantially radial annular edge by an annular joint zone having a rounded shape cross-section profile.

13. A turbine engine according to claim 1, wherein the diffuser is an axial diffuser or is part of a diffuser-straightener unit.

14. A turbine engine according to claim 1, wherein the indentations are adapted to temporarily receive therein heads of injectors to be disengaged from injection systems.

15. A turbine engine according to claim 1, wherein the indentations have a width determined by one of an external diameter and a transversal encumbrance of radial ducts of the injectors.

16. A turbine engine according to claim 1, wherein the diffuser is to be mounted between a compressor and a combustion chamber for providing air to said combustion chamber.

* * * * *